United States Patent Office 2,930,781
Patented Mar. 29, 1960

2,930,781

PREPARATION OF RESINS

Louis Schmerling, Riverside, Ill., assignor, by mesne assignments, to Universal Oil Products Company, Des Plaines, Ill., a corporation of Delaware No Drawing. Application September 30, 1957
Serial No. 686,879

19 Claims. (Cl. 260—85.3)

This invention relates to a process for preparing novel resins, and particularly to a process for preparing resins by reacting a bicyclic compound with an olefin. More particularly this invention relates to the use of norbornadiene as a starting material in the preparation of resins.

An object of this invention is to prepare novel resins by reacting a bicyclic compound with an olefin.

A further object of the invention is a process for preparing resins by reacting norbornadiene with an olefin and a saturated hydrocarbon in the presence of a free radical generating catalyst.

One embodiment of this invention resides in a process for the preparation of a resin by reacting norbornadiene with an olefin selected from the group consisting of aliphatic and cyclic olefins and a saturated hydrocarbon in the presence of a peroxy compound catalyst, said process being carried out at a condensation temperature at least as high as the decomposition temperature of the catalyst, and recovering the resultant resin.

Another embodiment of the invention resides in a process for the preparation of a resin by reacting norbornadiene with propylene and a saturated hydrocarbon in the presence of a peroxy compound catalyst, said process being carried out at a condensation temperature at least as high as the decomposition temperature of the catalyst and at a pressure such that a substantial portion of the reactants is in the liquid phase, and recovering the resultant resin.

A specific embodiment of the invention is found in a process for the preparation of a resin which comprises reacting norbornadiene with propylene and cyclohexane in the presence of a peroxy compound catalyst, said process being carried out at a condensation temperature at least as high as the decomposition temperature of the catalyst and at a pressure such that a substantial portion of the reactants is in the liquid phase, and recovering the resultant resin.

A more specific embodiment of the invention is found in a process for the preparation of a resin by reacting norbornadiene with ethylene and cyclohexane in the presence of di-t-butyl peroxide at a temperature in the range of from about 130° to about 140° C. and at a pressure in the range of from about 20 to about 60 atmospheres, and recovering the resultant resins.

Other objects and embodiments referring to alternative olefins, saturated hydrocarbons and peroxy compound catalysts will be found in the following further detailed description of the invention.

It has now been discovered that resins or resinous material may be prepared by reacting an unsaturated bicyclic compound such as norbornadiene, which may also be called bicyclo[2.2.1]-2,5-heptadiene, with an olefin and a saturated hydrocarbon. The physical properties of the resinous materials formed by the process of this invention are varied according to the particular unsaturated compound and saturated hydrocarbon which are used in the reaction. The aforesaid resinous materials will find a wide variety of use in many phases of everyday life, an important use of which is as a coating for various objects, especially in the electrical field. In addition, some resins formed by the process of this invention may be molded into various shapes by the application of heat and pressure and thus used per se, while another use of the resinous materials of the present invention may be as a packing material.

Suitable unsaturated hydrocarbons which may be condensed with the norbornadiene according to the present invention include aliphatic olefins such as ethylene, propylene, butene-1, butene-2, isobutylene, pentene-1, pentene-2, pentene-3, 2-methyl-2-butene, hexene-1, hexene-2, hexene-3, 2-methyl-1-hexene, 3-methyl-1-hexene, 4-methyl-1-hexene, 5-methyl-1-hexene, 2-methyl-2-hexene, 3-methyl-2-hexene, 4-methyl-2-hexene, 5-methyl-2-hexene, 2-methyl-3-hexene, 3-methyl-3-hexene, heptene-1, heptene-2, heptene-3, heptene-4, etc., the octenes, nonenes, decenes, etc.; cyclo-olefins including cyclopentene, cyclohexene, cycloheptene, etc.; alkyl cyclo-olefins such as 1-methyl-1-cyclopentene, 3-methyl-1-cyclopentene, 4-methyl-1-cyclopentene, 1-ethyl-1-cyclopentene, 3-ethyl-1-cyclopentene, 4-ethyl-1-cyclopentene, 1-methyl-1-cyclohexene, 3-methyl-1-cyclohexene, 4-methyl-1-cyclohexene, 1-ethyl-1-cyclohexene, 3-ethyl-1-cyclohexene, 4-ethyl-1-cyclohexene, 1-propyl-1-cyclopentene, 1-propyl-1-cyclohexene, 1-butyl-1-cyclopentene, 1-butyl-1-cyclohexene, etc. Saturated hydrocarbons which may be used in this invention include the paraffins such as n-butane, isobutane, n-pentane, isopentane, n-hexane, 2-methylpentane, 3-methylpentane, 2,2-dimethylbutane, 2,3-dimethylbutane, n-heptane, 2-methylhexane, 3-methylhexane, 2,2-dimethylhexane, 3,3-dimethylhexane, 2,3-dimethylpentane, 2,4-dimethylpentane, n-octane, 2-methylheptane, 3-methylheptane, 4-methylheptane, 2,2-dimethylheptane, 3,3-dimethylheptane, 4,4-dimethylheptane, 2-methyloctane, 3-methyloctane, 4-methyloctane, 2,2-dimethyloctane, 3,3-dimethyloctane, 4,4-dimethyloctane, 2,3-dimethyloctane, 2,4-dimethyloctane, 2,5-dimethyloctane, 2,6-dimethyloctane, 2,7-dimethyloctane, the nonanes, decanes, etc.; cycloparaffins such as cyclopentane, methylcyclopentane, ethylcyclopentane, 1,2-dimethylcyclopentane, 1,3-dimethylcyclopentane, 1,2,3-trimethylcyclopentane, cyclohexane, methylcyclohexane, ethylcyclohexane, 1,2-dimethylcyclohexane, 1,3-dimethylcyclohexane, 1,4-dimethylcyclohexane, 1,2,3-trimethylcyclohexane, 1,2,3,4-tetramethylcyclohexane hexamethylcyclohexane, menthane, decahydronaphthalene, etc. It is to be understood that the aforementioned unsaturated hydrocarbons and saturated hydrocarbons are only representatives of the classes of compounds which may be used and that the present invention is not necessarily limited thereto.

The catalysts which may be used in the present process are those which are capable of forming free radicals under the reaction conditions. These include peroxy compounds, containing the bivalent radical-O—O—, and which are capable of inducing the condensation of the norbornadiene with the aforementioned olefins. The organic peroxy compounds constitute a preferred class of catalysts for use in this invention and include peracetic acid, persuccinic acid, dimethyl peroxide, diethyl peroxide, di-t-butyl peroxide, dipropyl peroxide, butyryl peroxide, lauroyl peroxide, benzoyl peroxide, tetralin peroxide, urea peroxide, t-butyl peroxide, etc. Other catalysts which may be used are the persulfates, perborates and percarbonates of ammonium and the alkali metals, etc. as well as mixtures of the peroxy compounds. Only catalytic amounts, less than the stoichiometric amount, need be used in this process.

The reaction temperature employed in the process of this invention should be at least as high as the initial decomposition temperature of the free radical generating catalyst, such as a peroxide compound, in order to liberate and form free radicals which promote the reaction. However, the operating temperature generally does not exceed the decomposition temperature of the catalyst by more than about 150° C. In the continuous method of carrying out this process, the catalysts preferably are added continuously to the reaction zone, but, if desired, catalyst may be added intermittently, particularly when a packing material is used which retains the catalyst in the reaction zone. When a free radical generating catalyst such as t-butyl perbenzoate is used, having a decomposition temperature of approximately 115° C., the operating temperature of the process is from about 115° C. to about 265° C. When di-t-butyl peroxide having a decomposition temperature of about 130° C. is used the process is run at a temperature of from about 130° to about 280° C. Higher reaction temperatures may be employed, but little advantage is gained if the temperature is more than the hereinbefore mentioned 150° C. higher than the decomposition temperature of the catalyst. The general effect of increasing the operating temperature is to accelerate the rate of the condensation reaction between the olefins and the norbornadiene. However, the increased rate of reaction is accompanied by certain amounts of decomposition. The preferred operating pressure of the process is that needed to keep a substantial portion of the reactants in a liquid phase and will vary from about 1 to about 100 atmospheres or more.

Concentration of the catalysts employed in this process may also vary over a rather wide range but it is desirable to use low concentrations of catalysts such as from about 0.1% to about 10% of the total weight of an olefin and the norbornadiene charged to this process. The reaction time of the process may be within the range of from slightly less than one minute to about several hours. However, contact times of at least 10 minutes are usually preferred.

The process of this invention may be effected in any suitable manner and may comprise either a batch or a continuous type operation. When a batch type operation is used a quantity of the norbornadiene, the saturated hydrocarbon and the catalyst are placed in an appropriate apparatus such as a rotating autoclave. If the olefin used in the preparation of the resin is gaseous in nature, the autoclave is sealed and the olefin charged thereto, after which the apparatus is heated to the desired reaction temperature. If, however, the olefin is liquid in nature it may be added along with the norbornadiene, the saturated hydrocarbon and the peroxy compound catalyst before the autoclave is sealed and heated to the reaction temperature. After a suitable period of time has elapsed the reactor and the contents thereof are cooled to room temperature and the condensation product is recovered by conventional means, for example, by fractional distillation, crystallization, separation, etc.

Another method of operation of the present process, which constitutes the preferred method of operation, is of the continuous type. In this method of operation the norbornadiene, the saturated hydrocarbon, the olefin and the peroxy compound catalyst are continuously charged to a reaction zone which is maintained at the suitable operating conditions of temperature and pressure. The reaction zone may comprise an unpacked vessel or coil or it may be lined with an adsorbent packing material such as fire brick, alumina, dehydrated bauxite and the like. As hereinbefore stated the reactants and the catalyst may be charged to the reactor through separate lines or, if so desired, two or more of the aforementioned compounds may be admixed prior to entry into said reactor and charged thereto in a single line. After completion of the desired residence time the condensation products are continuously withdrawn and separated from the reactor effluent, the unconverted materials may then be recycled to the reaction zone to form a portion of the starting material while the desired product is purified and recovered by conventional means hereinbefore set forth.

A modification of the above mentioned process of adding the free radical generating catalyst to the reaction zone is found in the process of forming a catalyst in situ in the norbornadiene and then charging the resultant solution to the reaction zone together with the aliphatic or cyclic olefins and the saturated hydrocarbon. Formation of the peroxy compound catalyst in the norbornadiene may be accomplished by autooxidation, for example, by heating the compound while air is bubbling therethrough, preferably in the presence of a trace of the oxide formed in the presence of a previous antooxidation. Alternately, the air may be passed through the compound in the presence of an oxidation catalyst such as manganese stearate. In continuous methods of operation of carrying out this operation the catalysts are preferably added continuously to the reaction zone, but if desired, they may be added intermittently.

The following examples are given to illustrate the process of the present invention, which, however, are not intended to limit the generally broad scope of the present invention in strict accordance therewith.

*Example I*

Twenty grams of norbornadiene, 75 g. of cyclohexane and 5 g. of di-t-butyl peroxide were placed in a glass liner of a rotating autoclave having a capacity of 850 cc. The liner was placed in the autoclave which was sealed and ethylene was charged thereto until 40 atmospheres of initial pressure had been built up. The autoclave was heated to a temperature from about 130° to about 140° C. and maintained thereat for a period of about 4 hours, the maximum pressure at this temperature being 58 atmospheres. At the end of the aforementioned 4 hours, the autoclave and contents thereof were cooled to room temperature, the final pressure at room temperature being 23 atmospheres. The excess pressure was vented and the reaction products comprising of 108 g. was recovered. Of this 108 g., 66 g. of unreacted cyclohexane was separated and 38 g. of a soft, tacky, amber resin was recovered.

*Example II*

Twenty grams of norbornadiene, 75 g. of methylcyclohexane and 5 g. of t-butyl peroxide were placed in a glass liner of a rotating autoclave. The autoclave was sealed and 31 g. of propylene pressured in, the initial pressure being 12 atmospheres. The autoclave was heated to a temperature of from about 130° to about 140° C. and maintained thereat for a period of about 3.5 hours, the maximum pressure at this temperature being 20 atmospheres. At the end of this period the autoclave and contents thereof were cooled to room temperature, the final pressure at room temperature being 1 atmosphere. The autoclave was opened and 108 g. of reaction product was recovered from the liner. The product was subjected to distillation to remove the unreacted methylcyclohexane, the final product comprised 34 g. of an amber, friable resin.

*Example III*

A mixture of norbornadiene, n-heptane, and pentene-1, along with a benzoyl peroxide catalyst is placed in an autoclave which is thereafter sealed and heated to a temperature of from about 130° to about 140° C. and maintained thereat for a period of about 4 hours. At the end of this time the autoclave and contents thereof are cooled to room temperature. The excess pressure is vented, the reaction mixture is then subjected to fractional distillation to remove the unreacted starting materials and the desired amber resin is recovered.

I claim as my invention:

1. A process for the preparation of a resin which comprises reacting norbornadiene with an olefin selected from the group consisting of aliphatic and cyclic olefins, and a saturated hydrocarbon in the presence of a peroxy compound catalyst, said process being carried out at a condensation temperature at least as high as the decomposition temperature of the catalyst, and recovering the resultant resin.

2. A process for the preparation of a resin which comprises reacting norbornadiene with an olefin selected from the group consisting of aliphatic and cyclic olefins, and a saturated hydrocarbon in the presence of an organic peroxide catalyst, said process being carried out at a temperature at least as high as the decomposition temperature of the catalyst and at a pressure such that a substantial portion of the reactants is in the liquid phase, and recovering the resultant resin.

3. A process for the preparation of a resin which comprises reacting norbornadiene with ethylene and a saturated hydrocarbon in the presence of an organic peroxide catalyst, said process being carried out at a temperature at least as high as the decomposition temperature of the catalyst and at a pressure such that a substantial portion of the reactants is in the liquid phase, and recovering the resultant resin.

4. A process for the preparation of a resin which comprises reacting norbornadiene with propylene and a saturated hydrocarbon in the presence of an organic peroxide catalyst, said process being carried out at a temperature at least as high as the decomposition temperature of the catalyst and at a pressure such that a substantial portion of the reactants is in the liquid phase, and recovering the resultant resin.

5. A process for the preparation of a resin which comprises reacting norbornadiene with butylene and a saturated hydrocarbon in the presence of an organic peroxide catalyst, said process being carried out at a temperature at least as high as the decomposition temperature of the catalyst and at a pressure such that a substantial portion of the reactants is in the liquid phase, and recovering the resultant resin.

6. A process for the preparation of a resin which comprises reacting norbornadiene with cyclopentene and a saturated hydrocarbon in the process of an organic peroxide catalyst, said process being carried out at a temperature at least as high as the decomposition temperature of the catalyst and at a pressure such that a substantial portion of the reactants is in the liquid phase, and recovering the resultant resin.

7. A process for the preparation of a resin which comprises reacting norbornadiene with cyclohexene and a saturated hydrocarbon in the presence of an organic peroxide catalyst, said process being carried out at a temperature at least as high as the decomposition temperature of the catalyst and at a pressure such that a substantial portion of the reactants is in the liquid phase, and recovering the resultant resin.

8. A process for the preparation of a resin which comprises reacting norbornadiene with an olefin selected from the group consisting of aliphatic and cyclic olefins, and a saturated hydrocarbon in the presence of di-t-butyl peroxide, said process being carried out at a temperature at least as high as the decomposition temperature of the catalyst and at a pressure such that a substantial portion of the reactants is in the liquid phase, and recovering the resultant resin.

9. A process for the preparation of a resin which comprises reacting norbornadiene with an olefin selected from the group consisting of aliphatic and cyclic olefins, and a saturated hydrocarbon in the presence of t-butyl perbenzoate, said process being carried out at a temperature at least as high as the decomposition temperature of the catalyst and at a pressure such that a substantial portion of the reactants is in the liquid phase, and recovering the resultant resin.

10. A process for the preparation of a resin which comprises reacting norbornadiene with an olefin selected from the group consisting of aliphatic and cyclic olefins, and a saturated hydrocarbon in the presence of benzoyl peroxide, said process being carried out at a temperature at least as high as the decomposition temperature of the catalyst and at a pressure such that a substantial portion of the reactants is in the liquid phase, and recovering the resultant resin.

11. A process for the preparation of a resin which comprises reacting norbornadiene with an olefin selected from the group consisting of aliphatic and cyclic olefins, and an alkane in the presence of an organic peroxide catalyst, said process being carried out at a temperature at least as high as the decomposition temperature of the catalyst and at a pressure such that a substantial portion of the reactants is in the liquid phase, and recovering the resultant resin.

12. A process for the preparation of a resin which comprises reacting norbornadiene with an olefin selected from the group consisting of aliphatic and cyclic olefins, and pentane in the presence of an organic peroxide catalyst, said process being carried out at a temperature at least as high as the decomposition temperature of the catalyst and at a pressure such that a substantial portion of the reactants is in the liquid phase, and recovering the resultant resin.

13. A process for the preparation of a resin which comprises reacting norbornadiene with an olefin selected from the group consisting of aliphatic and cyclic olefins, and hexane in the presence of an organic peroxide catalyst, said process being carried out at a temperature at least as high as the decomposition temperature of the catalyst and at a pressure such that a substantial portion of the reactants is in the liquid phase, and recovering the resultant resin.

14. A process for the preparation of a resin which comprises reacting norbornadiene with an olefin selected from the group consisting of aliphatic and cyclic olefins, and a cycloalkane in the presence of an organic peroxide catalyst, said process being carried out at a temperature at least as high as the decomposition temperature of the catalyst and at a pressure such that a substantial portion of the reactants is in the liquid phase, and recovering the resultant resin.

15. A process for the preparation of a resin which comprises reacting norbornadiene with an olefin selected from the group consisting of aliphatic and cyclic olefins, and cyclopentane in the presence of an organic peroxide catalyst, said process being carried out at a temperature at least as high as the decomposition temperature of the catalyst and at a pressure such that a substantial portion of the reactants is in the liquid phase, and recovering the resultant resin.

16. A process for the preparation of a resin which comprises reacting norbornadiene with an olefin selected from the group consisting of aliphatic and cyclic olefins, and cyclohexane in the presence of an organic peroxide catalyst, said process being carried out a temperature at least as high as the decomposition temperature of the catalyst and at a pressure such that a substantial portion of the reactants is in the liquid phase, and recovering the resultant resin.

17. A process for the preparation of a resin which comprises reacting norbornadiene with an olefin selected from the group consisting of aliphatic and cyclic olefins, and methylcyclohexane in the presence of an organic peroxide catalyst, said process being carried out at a temperature at least as high as the decomposition temperature of the catalyst and at a pressure such that a substantial portion of the reactants is in the liquid phase, and recovering the resultant resin.

18. A process for the preparation of a resin which comprises reacting norbornadiene with ethylene and cyclohexane in the presence of di-t-butyl peroxide at a temperature in the range of from about 130° to about 140° C. and at a pressure in the range of from about 20 to about 60 atmospheres, and recovering the resultant resin.

19. A process for the preparation of a resin which comprises reacting norbornadiene with propylene and methylcyclohexane in the presence of di-t-butyl peroxide at a temperature in the range of from about 130° to about 140° C. and at a pressure in the range of from about 10 to about 25 atmospheres, and recovering the resultant resin.

References Cited in the file of this patent

UNITED STATES PATENTS 2,348,565    Ott _____ May 9, 1944

FOREIGN PATENTS 498,176    Belgium _____ Jan. 15, 1951
777,414    Great Britain _____ June 19, 1957

OTHER REFERENCES

Schmerling, JACS, vol. 78, June 1956, pages 2819–2821.